United States Patent [19]

Lugay et al.

[11] 4,070,490
[45] Jan. 24, 1978

[54] LIVER-LIKE PET FOOD

[75] Inventors: Joaquin Castro Lugay, Thornwood; Robert James Beale, New Rochelle, both of N.Y.

[73] Assignee: General Foods Corporation, White Plains, N.Y.

[21] Appl. No.: 665,207

[22] Filed: Mar. 9, 1976

[51] Int. Cl.² .................................................. A23K 1/04
[52] U.S. Cl. ...................................... 426/533; 426/335; 426/602; 426/647; 426/658; 426/805
[58] Field of Search .................. 426/533, 1, 335, 532, 426/647, 656, 512, 658, 601, 602; 424/84

[56] References Cited

U.S. PATENT DOCUMENTS

| 3,202,514 | 8/1965 | Burgess et al. | 426/74 |
| 3,532,514 | 10/1970 | Gerard | 426/533 |
| 3,745,023 | 7/1973 | Greenberg et al. | 426/805 |
| 3,928,643 | 12/1975 | Ishiguro et al. | 426/533 |

Primary Examiner—R. B. Penland
Attorney, Agent, or Firm—T. J. Carvis; D. J. Donovan; B. P. Struzzi

[57] ABSTRACT

This invention relates to the preparation of a textured pet food having the flavor and consistency of liver. The product is prepared by heating a homogenized mixture comprising fat, water, blood and a reducing sugar. According to a preferred embodiment, a stronger meat flavor is produced by the addition of yeast to the mixture before heating.

10 Claims, No Drawings

LIVER-LIKE PET FOOD

BACKGROUND OF THE INVENTION

The present invention is concerned with the production of a synthetic, liver-like product as a pet food.

The pet food art has for a considerable period of time been desirous of providing a pet food having the taste and texture of natural animal liver at reasonable cost and having good feeding properties. Exemplary of past efforts to obtain such a product is the disclosure of Example III in U.S. Pat. No. 3,653,908 to Buck et al. According to that disclosure, a complex mixture of ingredients including about 28% pork liver, is heated and extruded. There is no indication in the reference, however, that a liver-like texture is obtained. Moreover, while reducing sugars and animal blood are disclosed as alternative ingredients of the composition, there was no appreciation that a liver-like flavor and texture could be obtained by employing these materials in the absence of the pork liver.

Other liver-flavored pet foods are presently being sold commercially, however, we are not aware of any pet food formulation which derives a liver flavor and texture through the use of blood, water, reducing sugars and fat.

SUMMARY OF THE INVENTION

Accordingly, it is an object of the present invention to provide a pet food having a liver-like flavor and texture from economical, readily available raw materials.

This and other objects are accomplished according to the present invention which provides a pet food having the flavor and texture of animal liver and a process for preparing the pet food. The process comprises heating a mixture of water, emulsified fat, reducing sugar, and blood.

DETAILED DESCRIPTION

The present invention makes it possible for the first time to simply and economically prepare a pet food having the flavor and texture of animal liver without the need for employing liver in the formulation. The pet food so prepared can be packaged in any of the conventional moisture ranges. For example, it can be prepared as a dry pet food having a moisture content of less than about 15%; as an intermediate moisture pet food, having a moisture content of from about 15 to about 50%; or as a natural moisture range pet food, having a moisture content of above about 50%. The pet food prepared according to this invention preferably has a moisture content within the range of 15 to 50% and contains suitable additives to provide adequate shelf stability and balanced nutrition. The disclosure of U.S. Pat. No. 3,202,514 to Burgess et al. and copending U.S. application Ser. No. 231,436, filed Mar. 2, 1972 now abandoned, by R. E. Schara and C. T. Stocker are incorporated by reference in this regard.

Essential to the preparation of the pet food according to the present invention is the preparation of an oil-in-water emulsion wherein the fat component of the composition is emulsified in water. The emulsification can be obtained by employing any suitable emulsifying agent. Non-proteinaceous emulsifiers as well as proteinaceous emulsifiers can be used alone or in combination.

Preferably, the blood required to prepare the liver-like pet food is added to the composition prior to emulsification and is effective as an emulsifier. In the case where a non-proteinaceous emulsifier is employed, emulsifiers such as sodium stearoyl-2-lactylate, succinoylated monoglycerides, lecithin or mono and diglycerides are employed alone or in combination. Obviously, any other emulsifier having sufficient functionality to produce a stable emulsion can also be employed. For reasons of economy, however, it is obviously preferable to employ the natural emulsification capabilities of the blood component of the composition to supply at least a portion of the necessary emulsification. Where, however, it is desired to employ blood from a particular source which has only limited emulsification capability, an adjunct emulsifier, either proteinaceous or non-proteinaceous, should be supplied. Typical of other proteinaceous emulsifiers are those such as soy isolates, egg albumen and lactalbumin, which supply not only added emulsification functionality, but, moreover, provide additional protein to the composition.

The fat component can be selected from any of those available in quantity at reasonable cost. Poultry fat, lard, tallow, and butter oil are particularly preferred fat sources. However, other animal fats and also vegetable fats can be employed. It will be apparent to those skilled in the art that any particular lot of fat employed should not be inherently repulsive to the animals. To efficiently effect emulsification it is desirable to have the fat in a liquid state. Where the fat is naturally solid at the working temperatures involved, it is preferably first heated to a degree sufficient to cause it to liquify. Emulsification is then effected by vigorously agitating the mixture of water and liquid fat. The other components of the reaction composition can be added either before or after emulsification. The fat is employed at a level of from about 25 to about 95% based on the dry weight, e.g. solids content, of the total composition. Preferably it is employed at a level of from 75 to 95% based on the weight of the solids.

Further essential to the preparation of the artificial liver of the present invention is the use of animal blood. The blood has been found to possess highly desirable gelation properties when processed according to the present invention. It is therefore an essential ingredient from a textural as well as flavor standpoint.

The blood is preferably whole and can be either fresh or dried. If desired, but not necessarily, the blood can be defibrinogenated. Preferably, the blood is from domesticated meat producing animals such as cows, sheep, pigs and the like. However, there is presently no known criticality in the source of the blood. Where fresh whole blood is employed, it is preferably added prior to formation of the oil-in-water emulsion so that its water and protein content can aid in the formation of the emulsion. The blood can, however, be added, whether dried or whole, after emulsification. The blood is normally employed in amounts sufficient to provide a solids content of about 3 to about 15%, and preferably from about 8 to about 10%, based upon the total weight of solids present in the mixture. Based on the total weight of the composition including water, it is preferably employed at a level of from about 3 to about 6% based upon the total weight of the composition including water. Water should be present at a level of from 30% to 60% by weight of the total composition, and preferably 40 to 50%.

Further essential to the practice of the present invention is the use of a reducing sugar. The reducing sugar is defined as any of those carbohydrates that will reduce Fehling's solution or similar test liquids, with conversion of blue soluble copper salt to a red, orange or yellow precipitate of cuprous oxide. Specially preferred among these is glucose. However, other reducing sugars such as fructose, ribose, xylose, galactose, maltose and the like, can also be employed. The reducing sugar is employed in an amount of greater than about 2%, and preferably from about 3 to about 10% based upon the weight of the solids in the composition. Typically, it should be employed in an amount of from about 30% to about 70%, preferably 45 to 55%, of the weight of the dry solids content of the blood employed. As with the blood component, the reducing sugar can be added either before or after emulsification is effected; however, it is preferably added prior to emulsification.

The above ingredients, with other materials commonly added to pet foods, such as vitamins and minerals necessary to provide a balanced pet ration, are homogenized and then heated for a period of time effective to generate the liver-like taste and texture. Typically, heating times of from about 10 minutes to about 2 hours, preferably about 15 minutes, in a steam heated autoclave at a pressure of from about 5 to about 25 psig, preferably about 15 psig, will be effective. After heating, the material is preferably sliced into chunks and packaged.

As indicated above, the pet food of the present invention can be packaged at any desired moisture level. Typically, where the pet food is dried to a moisture content within the conventional dry range no preservation system is required; however, it may be desirable for this liver-simulating product to have a texture somewhat softer than conventional dry foods. To achieve this softer texture in a dry food, low levels of humectants such as glycerol, propylene gylcol, butylene glycol, sorbital and mannitol are desirably infused into the product either before or after drying. Thus, levels of humectants of this type of from about 1 to about 10, and preferably from about 2 to about 7% based on the dry weight of the composition provide unusual and desirable textural modifications to the product. Where the level of humectant is small, it is possible to add it to the reaction mixture prior to heating.

In like manner with the dry texture, intermediate moisture range products having shelf stability can be obtained by employing suitably effective amounts of known water binders to the composition. Thus, the preservatives systems disclosed in the aforementioned Burgess, et al Patent and the Schara, et al application can be advantageously employed to obtain stable, intermediate moisture pet foods adapted to be packaged in non-hermetic packaging material without sterilization and stored for long periods without refrigeration. It is noted in this regard that those hydrophilic colloids within the description of the Schara, et al application which can also be classified as reducing sugars, are advantageously employed not only for their water binding capabilities, but also, when employed prior to heating, for the desirable textural and flavor effects which they provide according to the teachings of the present invention.

Where higher moisture contents on the order of from about 50 to about 80% are desired, the composition prepared according to the present invention is preferably packaged in a sealed container containing a gravy-like material and subjected to conventional commercial autoclaving. The gravy-like material can be of any desired formulation, but is preferably obtained by reacting the fat, blood and reducing sugar according to the above teachings but with an excess of water and under agitation such that a thick gravy, as opposed to a solid mass is obtained. The agitation can be employed during or after heat setting to obtain the gravy.

A particularly unusual and desirable feature of the product of the present invention is that it has the ability to be finely ground after heat setting, reslurried with water alone or in combination with a typical intermediate moisture preservative system, and then heat set again into the desired shape. This unexpected property of the material of the present invention thus allows reacting under the most desired conditions for producing the optimum flavor for the product and then adding the preservative system and extruding in the manner described in the aforementioned Burgess et al patent. The grinding can be done in any suitably effective device, typical of which is a Waring Blendor.

Another unexpected and advantageous utility of the present invention has been found where the material is ground and added either alone or with fat as a surface coating to a dry or soft moist pet food. According to this embodiment, the liver-like material is ground in a Waring Blendor or other suitable device, either alone or in combination with a fat, and then coated onto the pet food. Ease of coating can be enhanced by emulsifying the fat and ground liver-like material in sufficient water to enable spraying the mixture onto the pet food. Thus, the present invention unexpectedly makes it possible to improve the palatability of pet foods by a simple and economical process involving reacting very small amounts of blood and reducing sugars in addition to the fat normally applied as a surface coating and adding this material to the pet food in very small amounts.

The ground, liver-like material produced according to the present invention can be surface coated onto the pet foods in any suitably effective amount. Preferred levels of addition are from about 0.5 to about 10, and preferably from about 1 to about 5% based on the total weight of the animal food.

The following examples are presented for the purpose of further illustrating and explaining the present invention, and are not to be taken as limiting in any regard. Unless otherwise indicated, all parts and percentages are by weight.

EXAMPLE I

The following materials are mixed together, homogenized in a Tekmar homogenizer, and then heated in an autoclave for about 15 minutes at a steam pressure of about 15 psig:

Bleachable Fancy Tallow — 910 grams
Water — 910 grams
Dried Blood — 91 grams
Glucose — 45.5 grams Upon heating, a liver-like texture and flavor is developed in the composition. The material is then sliced into chunks.

EXAMPLE II

The procedure of Example I is repeated except that this time 45.5 grams of yeast extract is also employed in the mixture. The product of this Example also has a liver taste and texture, with an even stronger meaty flavor.

The Products of both Examples I and II are well received by dogs and can be offered alone or in combination with intermediate-moisture, beef, egg, cheese or chicken flavored dog foods of the kind described in the aforementioned Burgess et al patent, the noted Schara et al application, and other recently published patents. Thus, extruded beef-flavored strands of Burgess et al. mixed with the liver-like chunks prepared as above but with a preservative system, provides an attractive dog food. Similarly, the other combinations are well received.

EXAMPLE III

The product of Example II was ground and added as a partial replacement for tallow and coated onto a commercial kibbled dog food, which normally contains the tallow at a 4% level. One sample containing 1% tallow and 3% of the product of Example II, was fed to a dog panel, but no statistical difference was observed versus the 4% tallow control. Another sample, containing 3% tallow and 1% of the product of Example II, was preferred to the control.

EXAMPLE IV

A product was prepared in similar manner to that of Example II, but heated for 60 minutes instead of 15 minutes. This product was ground and tested as in Example III. It was preferred to the 4% tallow-coated control when replacing either 1% or 3% of the tallow.

Many modifications and variations of the present invention will become apparent to those skilled in the art upon reading of the above disclosure. It is intended that all such modifications and variations be included within the scope of the invention which is defined by the following claims.

What is claimed is:

1. A process for preparing a liver-like pet food which comprises:
   a. preparing an aqueous reaction mixture of emulsified fat, whole blood, and a reducing sugar; and
   b. heating the reaction mixture for a time and at a temperature effective to solidify the mixture and produce a textured, liver-like material.

2. A process according to claim 1 wherein the fat, blood, and reducing sugar are admixed and then subjected to agitation sufficient to emulsify the fat in the water.

3. The process according to claim 1 wherein, based on the solids content, the blood is added in an amount of from 3 to about 15% solids, the fat in an amount of from 25 to 90%, and the reducing sugar in an amount greater than 2%; and the reaction mixture comprises from about 30 to about 60% of water.

4. The process according to claim 3 wherein the blood is employed at a level from 3 to 6% based on the total weight of the composition, and the reducing sugar is employed at a level of from about 30 to about 70% based on the dry solids content of the blood.

5. The process according to claim 4 wherein the fat is employed at a level of from 75 to 90% based on the solids content of the reaction mixture.

6. The process according to claim 5 wherein the water content of the reaction mixture is in the range of from 40 to 50%.

7. The process according to claim 3 wherein the liver-like material is infused with a preservative system capable of preventing microbial growth in the food without the need for hermetic packaging or sterilization.

8. The process according to claim 3 wherein the liver-like material is ground, reshaped, and again heated to set the material into a cohesive piece.

9. The process according to claim 3 wherein the liver-like material is dried to a moisture content below 15%.

10. The product of claim 1.

* * * * *